US012656203B2

(12) United States Patent
Lei et al.

(10) Patent No.: US 12,656,203 B2
(45) Date of Patent: Jun. 16, 2026

(54) SENSOR MODULE WITH CALIBRATION INFORMATION

(71) Applicant: UNEO INC., Taipei (TW)

(72) Inventors: Han-Ying Lei, Taipei (TW);
Chih-Sheng Hou, Taipei (TW);
Chih-Hung Huang, Taipei (TW)

(73) Assignee: UNEO INC., Taipei (TW)

( * ) Notice: Subject to any disclaimer, the term of this patent is extended or adjusted under 35 U.S.C. 154(b) by 284 days.

(21) Appl. No.: 18/506,329

(22) Filed: Nov. 10, 2023

(65) Prior Publication Data

US 2025/0155310 A1     May 15, 2025

(51) Int. Cl.
*G01L 25/00*             (2006.01)

(52) U.S. Cl.
CPC ................................... *G01L 25/00* (2013.01)

(58) Field of Classification Search
CPC ...................................................... G01L 25/00
See application file for complete search history.

(56) References Cited

U.S. PATENT DOCUMENTS 7,068,142 B2 * 6/2006 Watanabe ........ H01C 17/06586
                                                                    338/114
9,766,140 B2 * 9/2017 Hou .......................... G01L 1/16

11,160,926 B1 * 11/2021 Halac .................. A61M 5/1723
2010/0097336 A1 * 4/2010 Gomes .................. G06F 3/0418
                                                                          345/173
2018/0042553 A1 * 2/2018 Min ........................ A61B 5/283

FOREIGN PATENT DOCUMENTS

CN         202351346 U  *  7/2012
KR      20150042261 A  *  4/2015  ........... A61B 5/6843
WO   WO-2017193743 A1 * 11/2017  ............. G09G 5/373

* cited by examiner

*Primary Examiner* — Octavia Hollington
(74) *Attorney, Agent, or Firm* — HAUPTMAN HAM, LLP

(57)                ABSTRACT

The present invention incorporates memory within a sensor module, with the memory storing calibration information, production information, or client information. When the memory contains calibration information, it forms a calibrated sensor module. If the memory stores production information or client information, the system will automatically connect to a remote server through internet to obtain a corresponding calibration information for the sensor module when the client first uses it. Therefore, when the client's sensor module malfunctions, they can purchase a new one from the manufacturer, replace it themselves, and continue using the sensor module without having to send it back to the original manufacturer for repairs or replacement. This can save labor, resources, costs, and time.

31 Claims, 18 Drawing Sheets

200

100

200

201

202

203

Calibration for a sensor module before leaving factory
(wherein a memory is prepared to store calibration information)

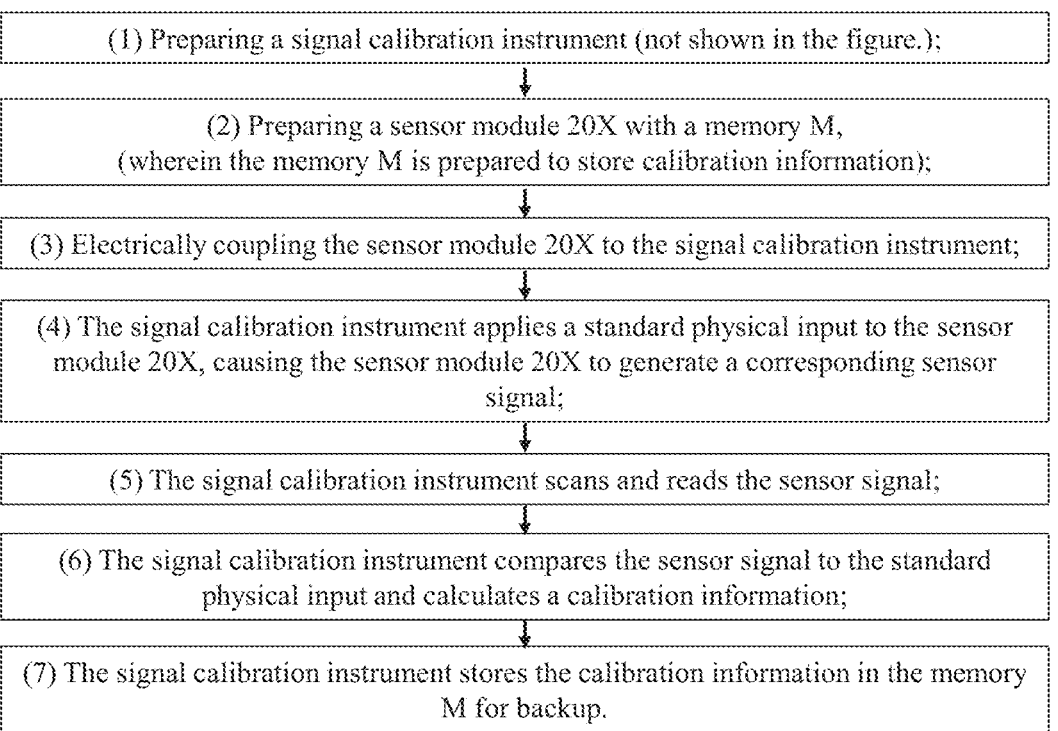

(1) Preparing a signal calibration instrument (not shown in the figure.);

(2) Preparing a sensor module 20X with a memory M,
(wherein the memory M is prepared to store calibration information);

(3) Electrically coupling the sensor module 20X to the signal calibration instrument;

(4) The signal calibration instrument applies a standard physical input to the sensor module 20X, causing the sensor module 20X to generate a corresponding sensor signal;

(5) The signal calibration instrument scans and reads the sensor signal;

(6) The signal calibration instrument compares the sensor signal to the standard physical input and calculates a calibration information;

(7) The signal calibration instrument stores the calibration information in the memory M for backup.

FIG 10

**When the memory contains calibration information,
procedure for testing physical inputs on client-side is as follows:**

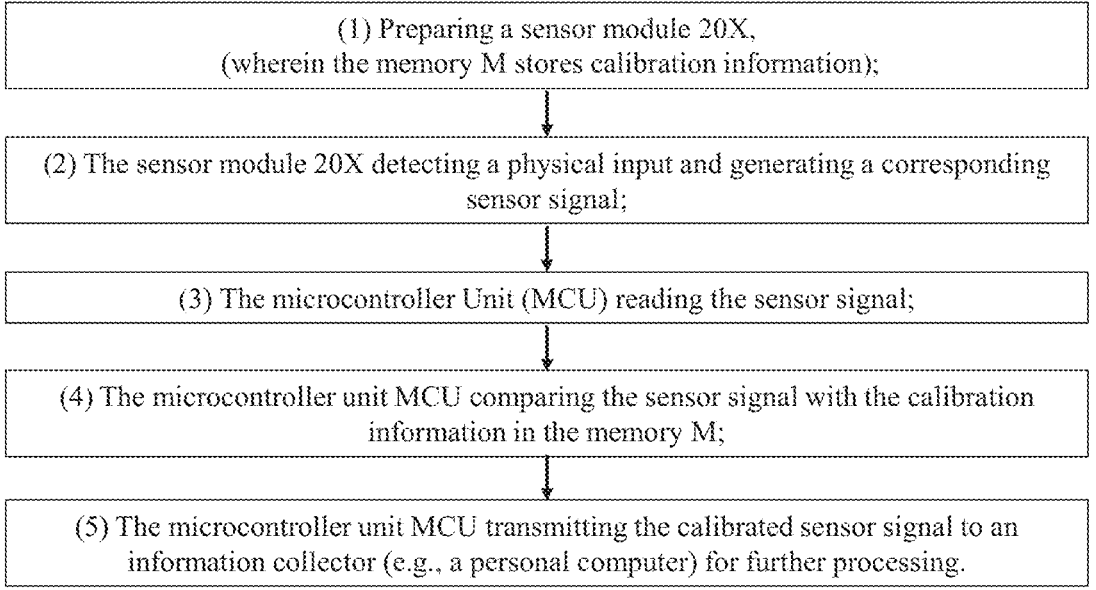

(1) Preparing a sensor module 20X,
(wherein the memory M stores calibration information);

(2) The sensor module 20X detecting a physical input and generating a corresponding
sensor signal;

(3) The microcontroller Unit (MCU) reading the sensor signal;

(4) The microcontroller unit MCU comparing the sensor signal with the calibration
information in the memory M;

(5) The microcontroller unit MCU transmitting the calibrated sensor signal to an
information collector (e.g., a personal computer) for further processing.

FIG 11

Calibration Procedure before the Sensor Module Leaving Factory.
(wherein, memory M only stores production information or client information)

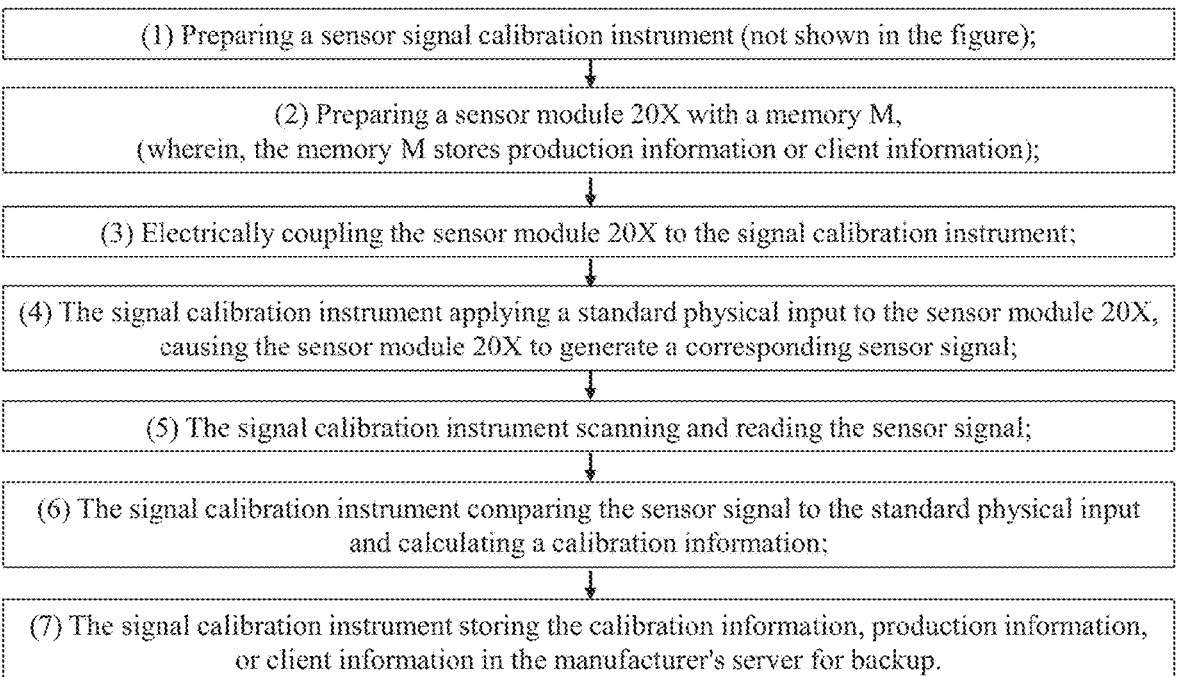

(1) Preparing a sensor signal calibration instrument (not shown in the figure);

(2) Preparing a sensor module 20X with a memory M,
(wherein, the memory M stores production information or client information);

(3) Electrically coupling the sensor module 20X to the signal calibration instrument;

(4) The signal calibration instrument applying a standard physical input to the sensor module 20X,
causing the sensor module 20X to generate a corresponding sensor signal;

(5) The signal calibration instrument scanning and reading the sensor signal;

(6) The signal calibration instrument comparing the sensor signal to the standard physical input
and calculating a calibration information;

(7) The signal calibration instrument storing the calibration information, production information,
or client information in the manufacturer's server for backup.

FIG 14

Procedure for the client to obtain calibration information.
(wherein the memory M contains production information or client information.

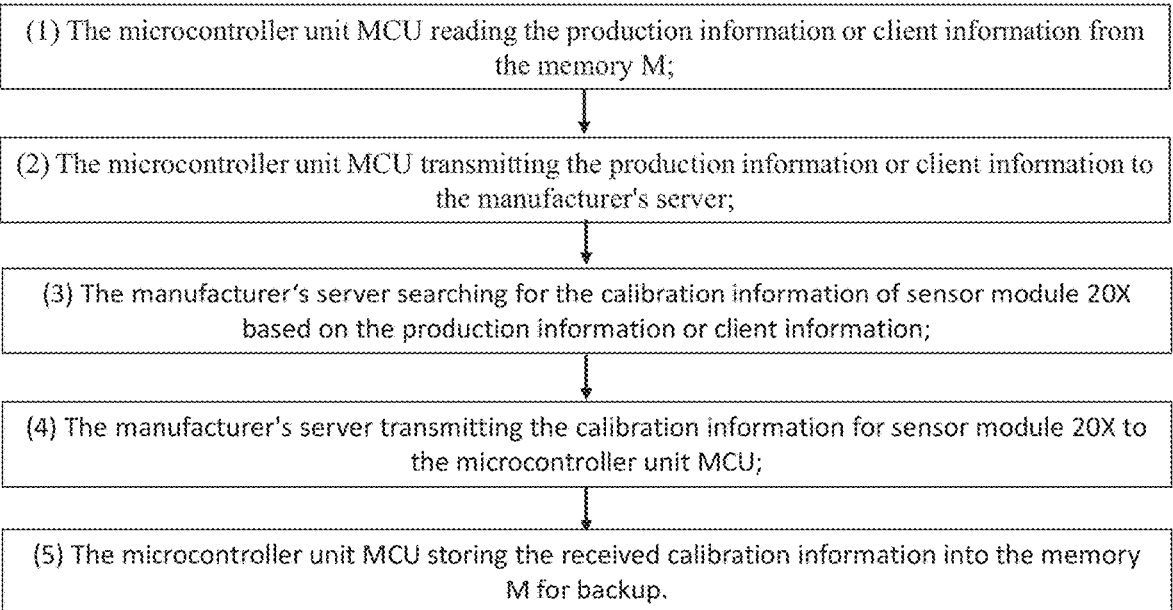

(1) The microcontroller unit MCU reading the production information or client information from the memory M;

(2) The microcontroller unit MCU transmitting the production information or client information to the manufacturer's server;

(3) The manufacturer's server searching for the calibration information of sensor module 20X based on the production information or client information;

(4) The manufacturer's server transmitting the calibration information for sensor module 20X to the microcontroller unit MCU;

(5) The microcontroller unit MCU storing the received calibration information into the memory M for backup.

FIG 15

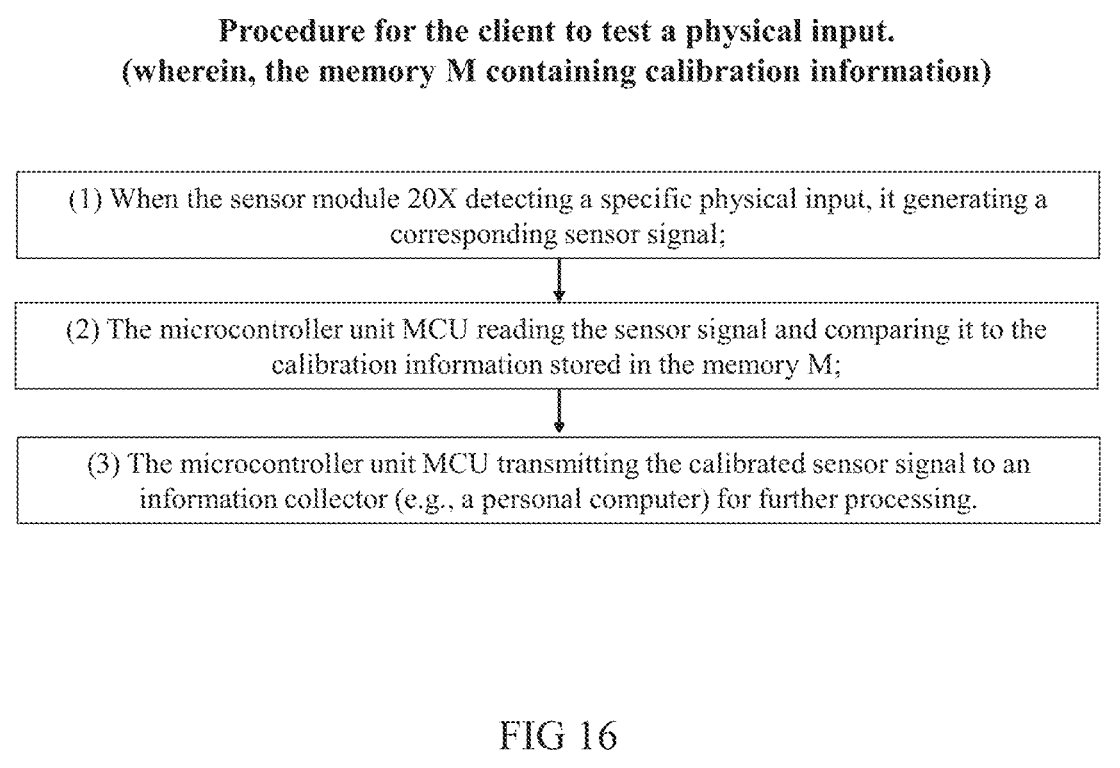

Procedure for the client to test a physical input.
(wherein, the memory M containing calibration information)

| (1) When the sensor module 20X detecting a specific physical input, it generating a corresponding sensor signal; |
|---|

↓

| (2) The microcontroller unit MCU reading the sensor signal and comparing it to the calibration information stored in the memory M; |
|---|

↓

| (3) The microcontroller unit MCU transmitting the calibrated sensor signal to an information collector (e.g., a personal computer) for further processing. |
|---|

FIG 16

SENSOR MODULE WITH CALIBRATION INFORMATION

BACKGROUND

Technical Field

The present invention relates to a sensor module, especially one with memory that stores calibration information, production information, or client information inside the memory. The sensor module according to the present invention can be one of force sensor modules, temperature sensor modules, and humidity sensor modules.

Description of Related Art

FIG. 1 shows a prior art

A force sensor module is used as an example for explanation. FIG. 1 shows a known force sensor module 100, comprising a force sensing unit 11, a tail circuit 12, and metal electrodes 13. Typically, this force sensor module requires external scanning circuits and personal computers to operate. If there is a need to replace the force sensor module 100, the sensor module must be sent back to the manufacturer for replacement, and clients cannot purchase the force sensor module 100 themselves. This is because the force sensor module 100 requires calibration before leaving the factory. However, only the original manufacturer has specialized machines and confidential algorithms for calibration. Therefore, when clients need to replace the force sensor module 100, they must return the product to the manufacturer, which is time-consuming, labor-intensive, costly, and leaves the client without a machine for a period of time. This calibration information is typically communicated to the client by the manufacturer for online updates, and then stored on the client's personal computer for use with the new force sensor module. This known force sensor module cannot be replaced by clients themselves when needed, resulting in inconvenience for the clients.

The inventors of this case first conceived the idea: if it is possible to improve the force sensor module to include calibration information, clients can purchase the components and replace them themselves. This would offer the advantages of simplicity, speed, convenience, energy savings, cost savings, and immediate machine availability.

SUMMARY OF THE INVENTION

This invention relates to sensor modules. The present invention stores "calibration information" in a memory and combines this memory with the sensor module. Clients can purchase the sensor module or related components from the manufacturer and replace them themselves when the sensor module malfunctions, allowing them to continue using the sensor module without the need to send the entire sensor module back to the manufacturer for repairs or replacement. This can save on labor, resources, finances, and time costs.

BRIEF DESCRIPTION OF THE DRAWINGS

FIG. 10 shows a calibration procedure of the sensor module before leaving the factory. (A procedure for preparing memory to store calibration information).

FIG. 11 shows a procedure for testing physical inputs on client side according to the present invention. (Wherein the memory contains calibration information.)

FIG. 14 shows a calibration procedure of the sensor module before leaving the factory according to the present invention. (Wherein the memory only contains production information or client information.)

FIG. 15 shows a procedure for the client to obtain calibration information of the sensor module according to the present invention. (Wherein the memory only contains production information or client information.)

FIG. 16 shows a procedure for the client to test physical inputs with the sensor module according to the present invention. (Wherein the memory contains calibration information.)

DETAILED DESCRIPTION OF THE INVENTION

A memory is integrated into a sensor module, the memory stores at least one of calibration information, production information, and client information. Clients can purchase components of the sensor module and assemble them themselves in case the sensor module malfunctions, eliminating the need for factory maintenance.

FIGS. 2-5 shows a first embodiment according to the present invention.

Figure 1:
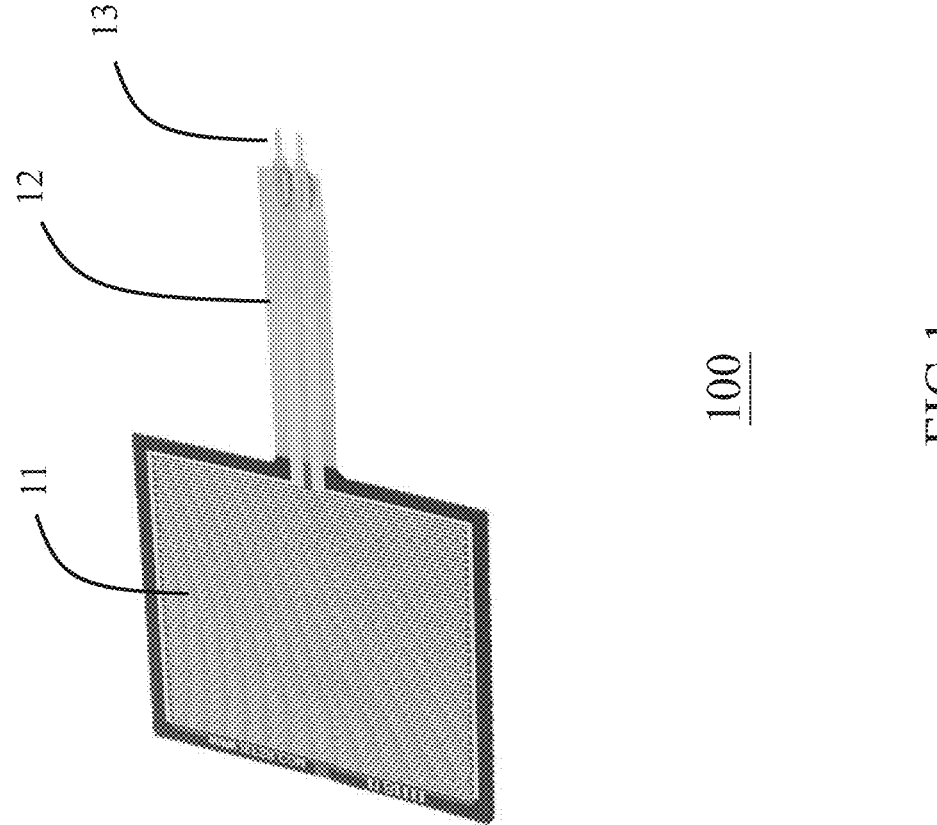
FIG. 1 shows a prior art.
Figure 2:
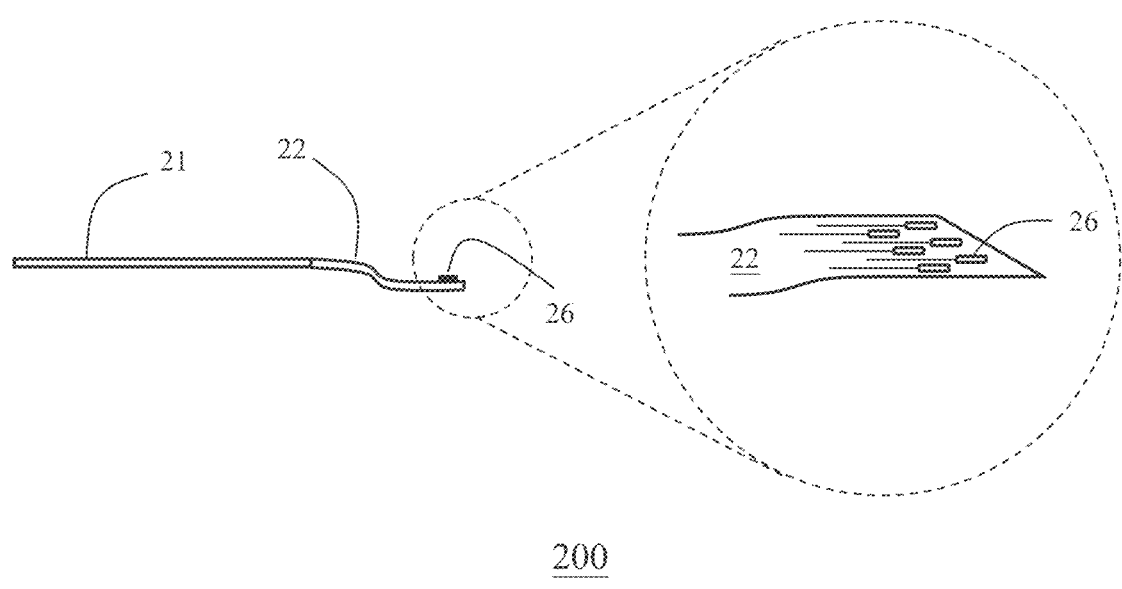
FIGS. 2-5 shows a first embodiment according to the present invention.

FIG. 2 shows a structure of a force sensor module according to the present invention.

In FIG. 2, a sensor module 200 is shown, which includes a sensing unit 21, tail circuit 22, and multiple metal pads 26. These multiple metal pads 26 are positioned on an end of the tail circuit 22, providing the sensor module with the ability to electrical couple to other components.

Figure 3:
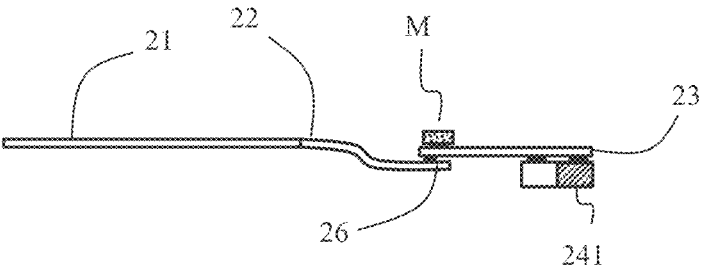

FIG. 3 shows a sensor module according to the present invention.

FIG. 3 shows a sensor module 201, comprising a sensing unit 21, a tail circuit 22, multiple metal pads 26, a memory M, a circuit board 23, and an interface 241.

The left end of the tail circuit 22 is electrically coupled to the sensing unit 21. The left end of the first circuit board 23 is electrically coupled to the right end of the tail circuit 22. The memory M is situated on the first circuit board 23 and electrically coupled to it. The interface 241 is located at the right end of the first circuit board 23, providing electrical coupling for the sensor module 201 to other components. The memory M contains at least one of the information: calibration information, production information, and client information.

Figure 4:
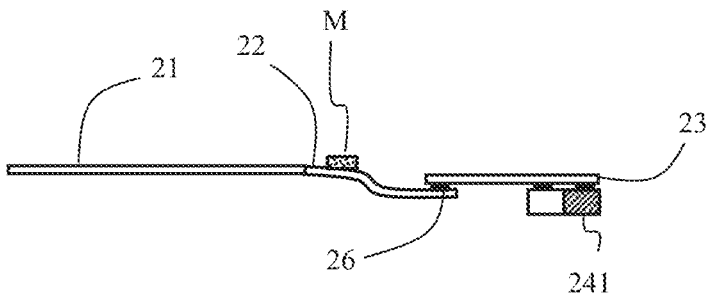

FIG. 4 shows a design variation of the sensor module according to the present invention.

In FIG. 4, the sensor module 202 has the memory M placed on the tail circuit 22, wherein the memory M electrically coupled to the first circuit board 23.

Figure 5:
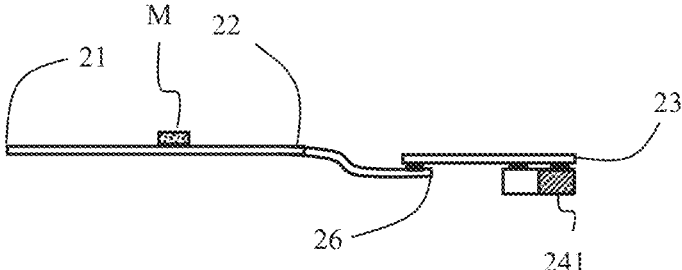

FIG. 5 shows another design variation of the sensor module according to the present invention.

In FIG. 5, the sensor module 203 has the memory M positioned on the sensing unit 21, wherein the memory M electrically coupled to the first circuit board 23.

FIGS. 6-9 shows a second embodiment according to the present invention.

Figure 6:
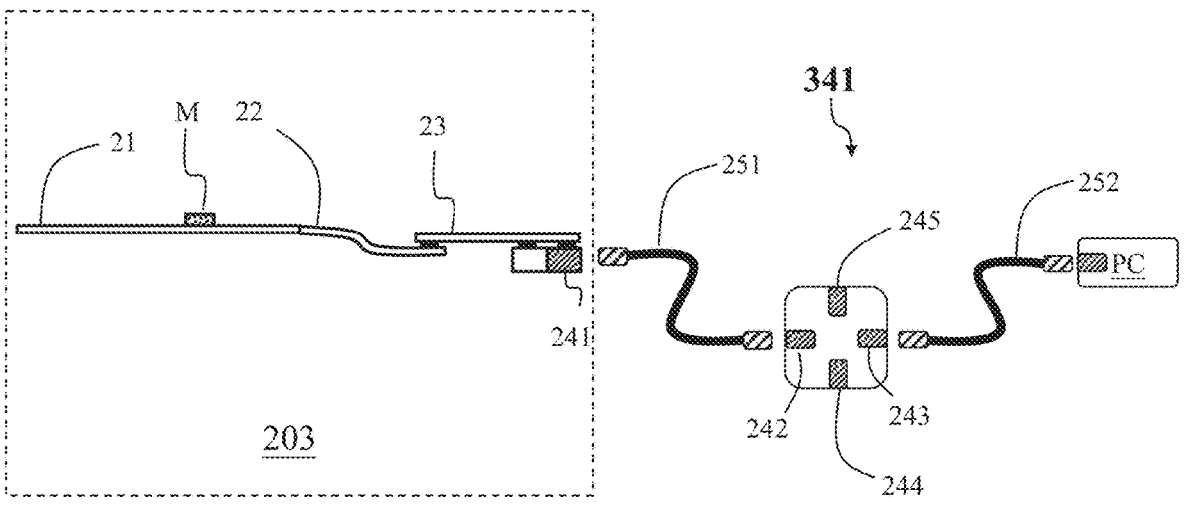
FIGS. 6-9 shows a second embodiment according to the present invention.

FIG. 6 shows the sensor module ready for electrical coupling to a scanning circuit box, and the scanning circuit box ready for electrical coupling to a PC according to the present invention.

In FIG. 6, a cable 251 provides a quick connect and disconnect for the electrical coupling between the sensor module 203 and the scanning circuit box 341. The cable 251, on the left end, is prepared for electrical coupling to the interface 241 of the sensor module 203, and on the right end, it is ready for electrical coupling to the scanning circuit box 341.

On the right side of FIG. 6, a cable 252 is prepared to provide a quick connect and disconnect for the electrical coupling between the scanning circuit box 341 and a personal computer (PC). The cable 252, on the left end, is prepared for electrical coupling to the scanning circuit box 341, and on the right end, it is ready for electrical coupling to the personal computer (PC).

Figure 7:
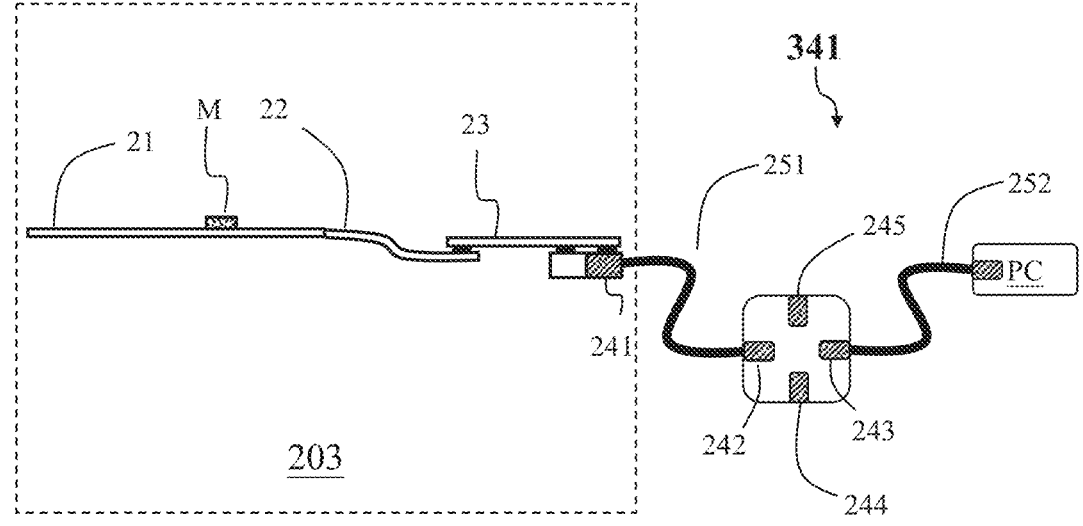

FIG. 7 shows an assembly status of FIG. 6.

FIG. 7 shows the sensor module 203, the scanning circuit box 341, and the personal computer (PC) in a state of electrical coupling among them, facilitated by cables 251 and 252.

The personal computer (PC) according to the present invention is provided as an example. Other similar information processing unit, such as mobile communication devices, remote servers, and other microcontrollers, can also be used in place of the personal computer (PC) according to the present invention.

Figure 8:
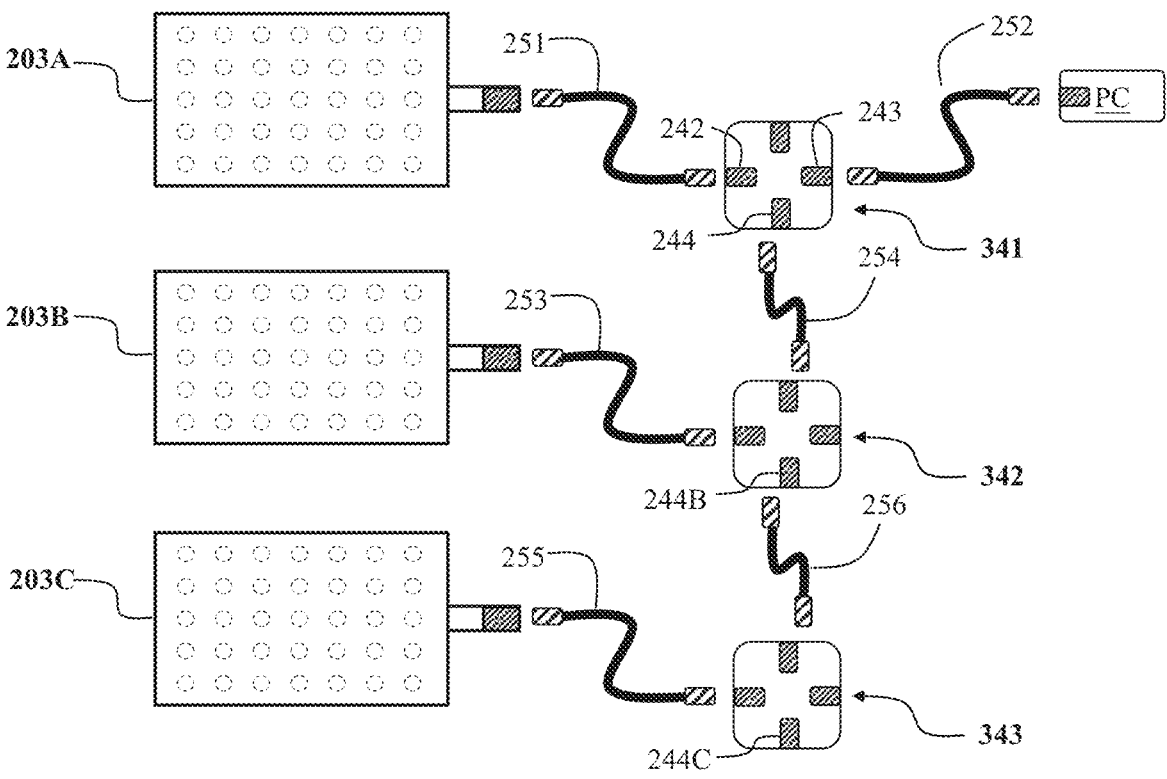

FIG. 8 shows a serial structure of scanning circuit boxes according to the present invention.

FIG. 8 shows three scanning circuit boxes, 341, 342, and 343, serially interconnected. A cable 254 is prepared for electrical coupling between scanning circuit boxes 341 and 342. A cable 256 is prepared for electrical coupling between scanning circuit boxes 342 and 343.

A cable 251 is prepared for electrical coupling between sensor module 203A and scanning circuit box 341. A cable 253 is prepared for electrical coupling between sensor module 203B and scanning circuit box 342, and a cable 255 is prepared for electrical coupling between sensor module 203C and scanning circuit box 343.

A cable 252 provides electrical coupling between scanning circuit box 341 and the personal computer (PC). The personal computer (PC) can also be replaced by other equivalent information processing units (not shown in the FIG.).

Figure 9:
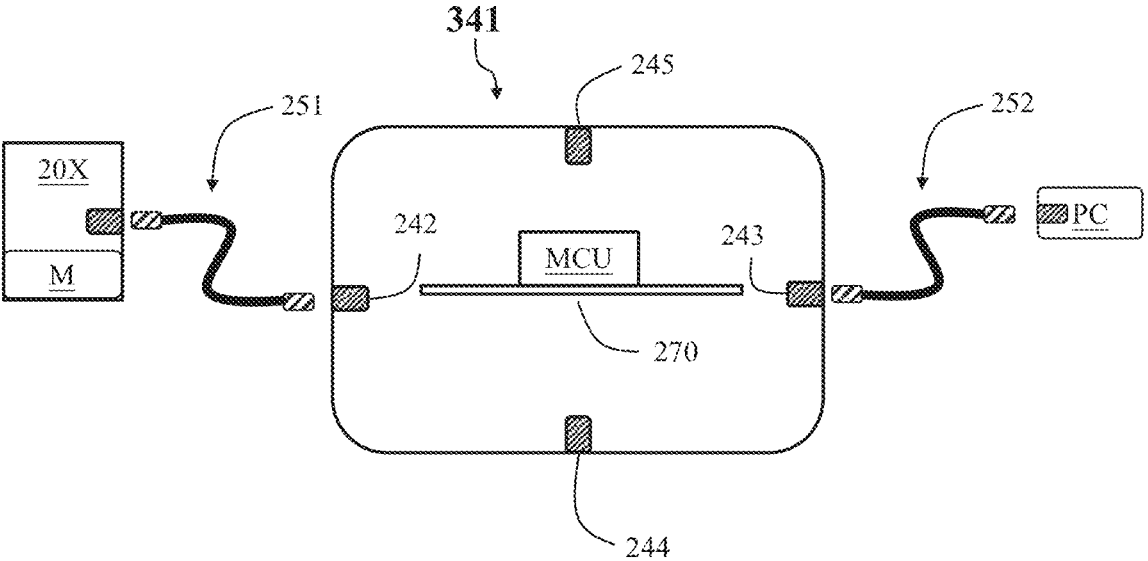

FIG. 9 shows a structure of a scanning circuit box according to the present invention.

FIG. 9 shows a sensor module 20X, ready for electrical coupling to a scanning circuit box 341 via cable 251, and a scanning circuit box 341, prepared for electrical coupling to the personal computer (PC) via cable 252.

FIG. 9 shows that the scanning circuit box 341 has four interfaces, 242, 243, 244, and 245 around its periphery. Inside the scanning circuit box 341, there is a circuit board 270 with a microcontroller unit MCU positioned on it. The microcontroller unit MCU, via the circuit board 270 and the cable 251, is electrically coupled to the memory M of the sensor module 20X for reading calibration information, production information, or client information.

After integrating data from the memory M in the sensor module 20X, the microcontroller unit MCU transfers the information to the personal computer (PC). The personal computer (PC) receives the information from the microcontroller unit MCU and performs necessary calculations and notifications. The personal computer (PC) also sends instructions to the microcontroller unit MCU for it to perform corresponding actions.

The sensor module according to the present invention can be a force sensor module, a temperature sensor module, or a humidity sensor module.

The sensor module can be purchased with the memory M contains one of the following two states according to the present invention: (1) the memory M contains calibration information, and (2) the memory M contains production information or client information only.

When clients purchase the sensor module according to the present invention, if memory M contains calibration information, they can directly install and use the sensor module.

If the memory M lacks calibration information but contains production information or client information, the first time the client activates it, the microcontroller unit MCU in the scanning circuit box will electrically couple to a remote server, search for a corresponding calibration information, download the calibration information, and store it in the memory M for backup.

The memory M according to the present invention is one selected from a non-volatile memory group consisting of: Programmable Read-Only Memory (PROM), Erasable Programmable Read-Only Memory (EPROM), Electrically Erasable Programmable Read-Only Memory (EEPROM), Flash memory, and Radio-Frequency Identification memory (RFID memory).

The interface according to the present invention is one selected from a group consisting of: RS232, SPI, I2C, RS485, Ethernet, WIFI, BLE, and Zigbee.

FIG. 10 shows a calibration procedure of the sensor module before leaving the factory according to the present invention. (A procedure for preparing memory to store calibration information).

FIG. 10 shows the calibration procedure before leaving the factory, which includes the following steps:

(1) Preparing a signal calibration instrument (not shown in the figure);

(2) Preparing a sensor module 20X with a memory M, (wherein the memory M is prepared to store calibration information);

(3) Electrically coupling the sensor module 20X to the signal calibration instrument;

(4) The signal calibration instrument applies a standard physical input to the sensor module 20X, causing the sensor module 20X to generate a corresponding sensor signal;

(5) The signal calibration instrument scans and reads the sensor signal;

(6) The signal calibration instrument compares the sensor signal to the standard physical input and calculates a calibration information;

(7) The signal calibration instrument stores the calibration information in the memory M for backup.

FIG. 11 shows a procedure for testing physical inputs on client side according to the present invention. (Wherein the memory M contains calibration information.)

FIG. 11 shows the procedure for clients to test physical inputs (with memory M storing calibration information), including the following steps:

(1) Preparing a sensor module 20X, (wherein the memory M stores calibration information);

(2) The sensor module 20X detecting a physical input and generating a corresponding sensor signal;

(3) The microcontroller unit MCU reading the sensor signal;

(4) The microcontroller unit MCU comparing the sensor signal with the calibration information in the memory M; and (5) The microcontroller unit MCU transmitting the calibrated sensor signal to an information processing unit (e.g., a personal computer) for further processing.

Figure 12:
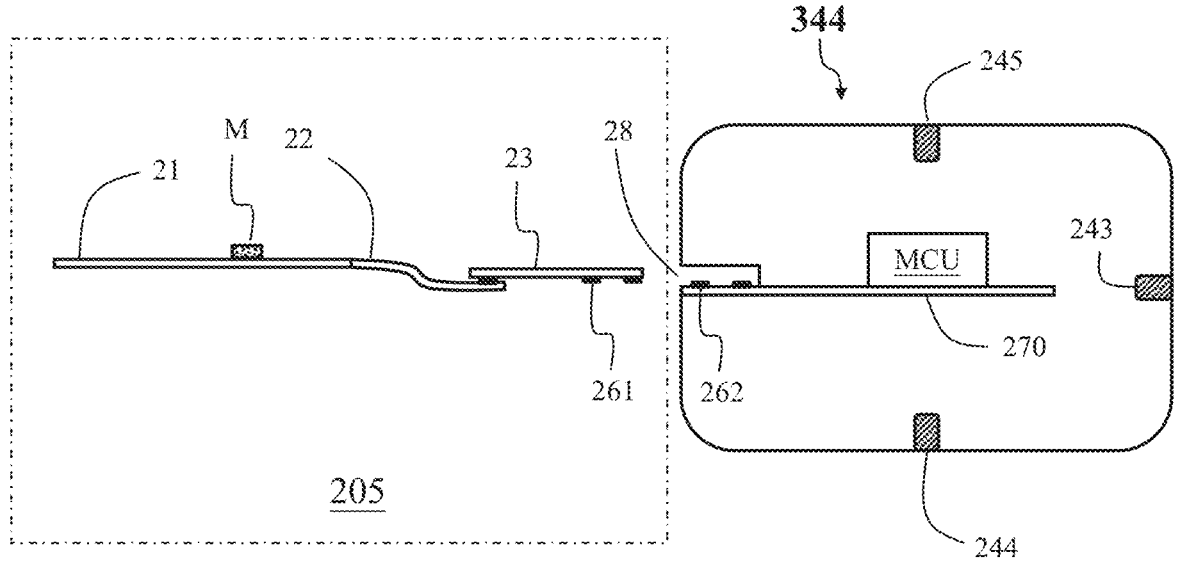
FIGS. 12-13 shows a third embodiment according to the present invention.
Figure 13:
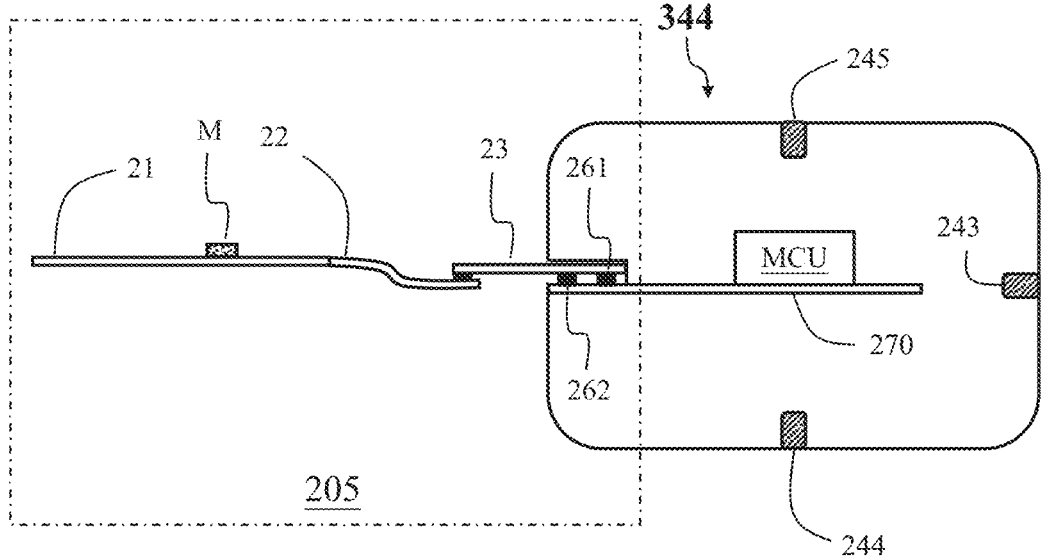

FIGS. 12-13 shows a third embodiment according to the present invention.

FIG. 12 shows multiple metal pads 261, positioned at the right end of the first circuit board 23, providing electrical coupling for the sensor module 205 to the external components.

FIG. 12 also shows the scanning circuit box 344, ready for electrical coupling to the sensor module 205. The scanning circuit box 344 includes a circuit board 270, and multiple metal pads 262 situated at the left end of the second circuit board 270.

The left end of the circuit board 270 extends to the left side wall of the scanning circuit box 344, wherein an opening 28 is located, exposing multiple metal pads 262. When the circuit board 23 of the sensor module 205 is inserted into the opening 28, the metal pads 261 will electrically couple to the metal pads 262.

FIG. 13 shows the assembly state of FIG. 12 according to the present invention. Wherein the circuit board 23 of the sensor module 205 is inserted into the opening 28, so that the metal pads 261 are electrically coupled to the metal pads 262.

FIG. 14 shows a calibration procedure of the sensor module before leaving the factory according to the present invention. (Wherein the memory M contains production information or client information.)

FIG. 14 shows a calibration procedure before leaving the factory for the sensor module according to the present invention. (wherein the memory M stores production information or client information.) The procedure includes the following steps:

(1) Preparing a sensor signal calibration instrument (not shown in the figure);

(2) Preparing a sensor module 20X with a memory M, (wherein, the memory M stores production information or client information);

(3) Electrically coupling the sensor module 20X to the signal calibration instrument;

(4) The signal calibration instrument applying a standard physical input to the sensor module 20X, causing the sensor module 20X to generate a corresponding sensor signal;

(5) The signal calibration instrument scanning and reading the sensor signal; (6) The signal calibration instrument comparing the sensor signal to the standard physical input and calculating a calibration information; and (7) The signal calibration instrument storing the calibration information, production information, or client information in the manufacturer's server for backup.

FIG. 15 shows a procedure for the client to obtain calibration information of the sensor module according to the present invention. (Wherein the memory M contains production information or client information.)

FIG. 15 shows a procedure for clients to obtain calibration information, which includes the following steps:

(1) The microcontroller unit MCU reading the production information or client information from the memory M;

(2) The microcontroller unit MCU transmitting the production information or client information to the manufacturer's server;

(3) The manufacturer's server searching for the calibration information of sensor module 20X based on the client information;

(4) The manufacturer's server transmitting the calibration information for sensor module 20X to the microcontroller unit MCU; and (5) The microcontroller unit MCU storing the received calibration information into the memory M for backup.

FIG. 16 shows a procedure for the client to test physical inputs with the sensor module according to the present invention. (Wherein the memory M contains calibration information.)

FIG. 16 shows a procedure for clients to test physical inputs, which includes the following steps:

(1) When the sensor module 20X detecting a specific physical input, it generating a corresponding sensor signal;

(2) The microcontroller unit MCU reading the sensor signal and comparing it to the calibration information stored in the memory M; and (3) The microcontroller unit MCU transmitting the calibrated sensor signal to an information processing unit (e.g., a personal computer) for further processing.

Figure 17:
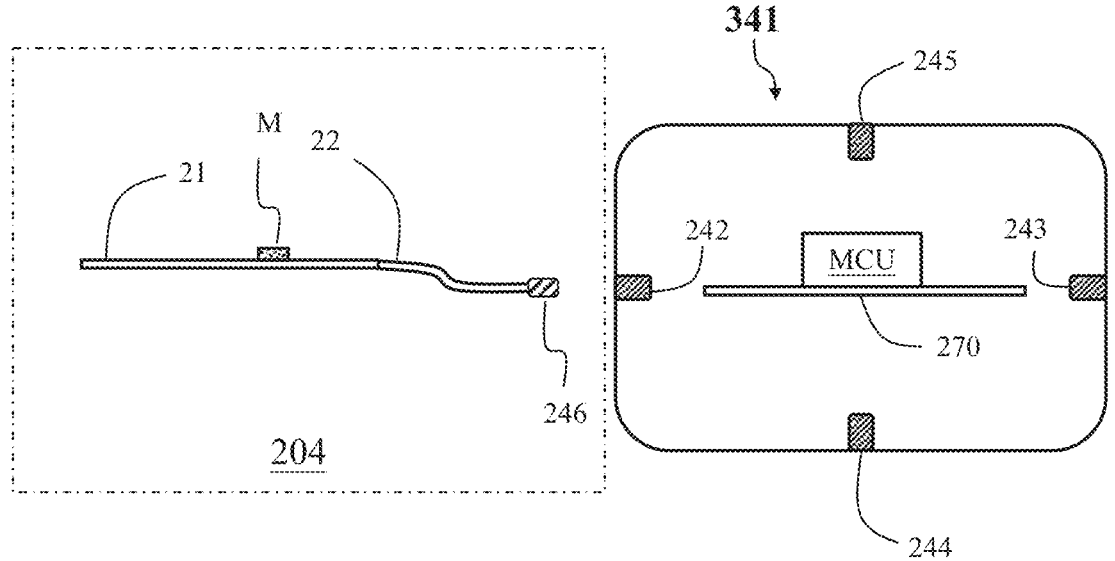
FIGS. 17-18 shows a fourth embodiment according to the present invention.
Figure 18:
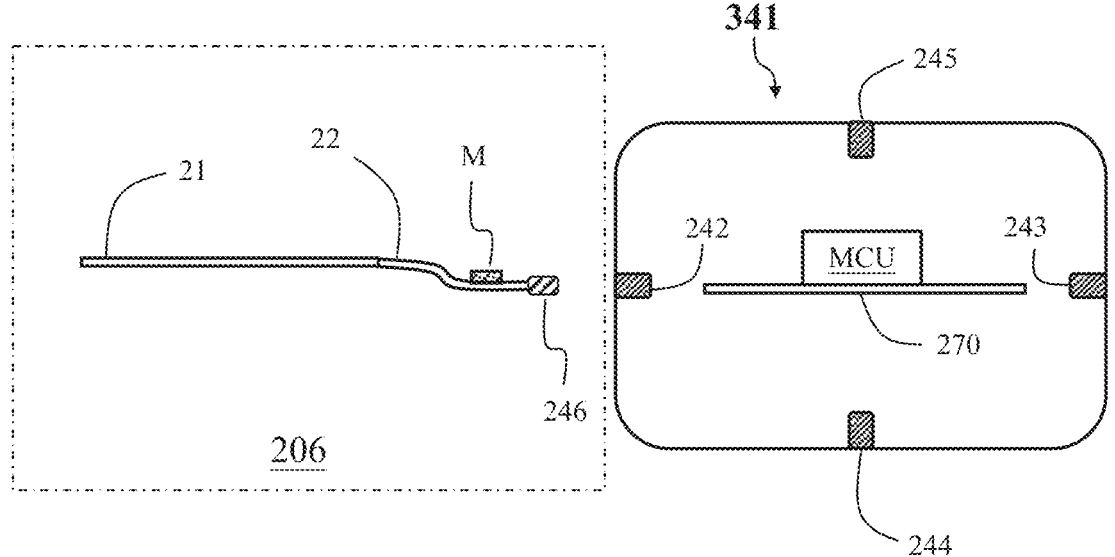

FIGS. 17-18 shows a fourth embodiment according to the present invention.

FIG. 17 shows a sensor module 204, which includes a sensing unit 21, a memory M, a tail circuit 22, and an interface 246. The left end of the tail circuit 22 is electrically coupled to the sensing unit 21, while the right end of the tail circuit 22 has an interface 246 configured thereon. The memory M is configured on the sensing unit 21, and the memory M is electrically coupled to the interface 246. The memory M contains at least one of the following types of information: calibration information, production information, and client information. The sensor module 204 is prepared to be electrically coupled to the scanning circuit box 341 via the interface 246.

FIG. 18 shows the memory M of sensor module 206, positioned on the tail circuit 22. The sensor module 206 is ready to be electrically coupled to scanning circuit box 341 via the interface 246, with the remaining structure being the same as shown in FIG. 17.

While several embodiments have been described by way of example, it will be apparent to those skilled in the art that various modifications can be made without departing from the spirit of the appended claims.

What is claimed is:

1. A sensor module with calibration information, comprising:

a sensing unit;

a tail circuit with a first end and a second end, wherein the first end of the tail circuit is electrically coupled to the sensing unit;

a first circuit board with a first end and a second end, wherein the first end of the first circuit board is electrically coupled to the second end of the tail circuit; and a memory located directly on the first circuit board or directly on the sensing unit.

2. The sensor module of claim 1, wherein the memory contains at least one information selected from a group consisting of: calibration information, production information, and client information.

3. The sensor module of claim 1, further comprising:

a first interface, located at the second end of the first circuit board, for quick connect and disconnect to an external element.

4. The sensor module of claim 3, further comprising:

a first scanning circuit box electrically coupled to the sensor module.

5. The sensor module of claim 4, further comprising:

a first cable with a first end and a second end, wherein the first end of the first cable is electrically coupled to the sensor module, and the second end of the first cable is electrically coupled to the first scanning circuit box.

6. The sensor module of claim 5, further comprising:

an information processing unit electrically coupled to the first scanning circuit box.

7. The sensor module of claim 6, wherein the information processing unit is selected from a device group consisting of: personal computer, mobile communication device, remote server, and another microcontroller.

8. The sensor module of claim 7, further comprising:

a second cable with a first end and a second end, wherein the first end of the second cable is electrically coupled to the first scanning circuit box, and the second end of the second cable is electrically coupled to the information processing unit.

9. The sensor module of claim 4, wherein the scanning circuit box further comprises:

a microcontroller unit electrically coupled to the memory for reading the calibration information from the memory.

10. The sensor module of claim 9, wherein the scanning circuit box further comprises:

a second circuit board, with the microcontroller unit mounted on the second circuit board, and the microcontroller unit is electrically coupled to the second circuit board.

11. The sensor module of claim 10, further comprising:

an information processing unit, wherein the first scanning circuit box is electrically coupled to the information processing unit, and the microcontroller unit, after integrating data from the sensor module and the memory, transmits the information to the information processing unit.

12. The sensor module of claim 11, wherein the information processing unit receives information from the microcontroller unit and performs corresponding calculations and notifications, and the information processing unit also sends instructions to the microcontroller unit to initiate corresponding actions.

13. The sensor module of claim 12, wherein the memory is a non-volatile memory selected from a group consisting of:

Programmable Read-Only Memory (PROM), Erasable Programmable Read-Only Memory (EPROM), Electrically Erasable Programmable Read-Only Memory (EEPROM), Flash memory, and Radio-Frequency Identification (RFID) memory.

14. The sensor module of claim 13, wherein the interface is one selected from a group consisting of: RS232, SPI, I2C, RS485, Ethernet, WIFI, BLE (Bluetooth Low Energy), and Zigbee.

15. The sensor module of claim 4, wherein the memory contains production information or client information; the scanning circuit box further comprises a microcontroller unit, wherein the microcontroller unit is electrically coupled to a remote server, and the microcontroller unit is configured to:

search for the corresponding calibration information, download the calibration information, and store the calibration information in the memory for backup.

16. The sensor module of claim 15, further comprises a calibration procedure before leaving factory, the calibration procedure comprises:

(1) preparing a sensor signal calibration instrument;

(2) preparing a sensor module with a memory which stores production information or client information;

(3) electrically coupling the sensor module to the signal calibration instrument;

(4) the signal calibration instrument applying a standard physical input to the sensor module, causing the sensor module to generate a corresponding sensor signal;

(5) the signal calibration instrument scanning and reading the sensor signal;

(6) the signal calibration instrument comparing the sensor signal to the standard physical input and calculating a calibration information; and (7) the signal calibration instrument storing the calibration information, production information, or client information into the manufacturer's server for backup.

17. The sensor module of claim 16, further comprising a client-side procedure for obtaining calibration information:

(1) a microcontroller unit MCU reading the production information or client information from the memory;

(2) the microcontroller unit MCU transmitting the production information or client information to the manufacturer's server;

(3) the manufacturer's server searching for the calibration information of the sensor module based on the production information or the client information;

(4) the manufacturer's server transmitting the calibration information to the microcontroller unit MCU; and (5) the microcontroller unit MCU storing the received calibration information into the memory for backup.

18. The sensor module of claim 17, further comprising a procedure for testing physical inputs on client-side, including:

(1) the sensor module generating a corresponding sensor signal when the sensor module detecting a specific physical input;

(2) the microcontroller unit MCU reading the sensor signal and comparing it to the calibration information stored in the memory; and (3) the microcontroller unit MCU transmitting the calibrated sensor signal to an information processing unit for further processing.

19. The sensor module of claim 1, wherein the sensor module is one selected from a group consisting of: a force sensor module, a temperature sensor module, and a humidity sensor module.

20. The sensor module of claim 1, further comprising a calibration procedure before leaving factory, which comprises:

(1) preparing a sensor signal calibration instrument;

(2) preparing a sensor module with a memory; (wherein the memory is prepared to store calibration information);

(3) electrically coupling the sensor module to the sensor signal calibration instrument;

(4) the signal calibration instrument applying a standard physical input to the sensor, causing the sensor to generate a corresponding sensor signal;

(5) the signal calibration instrument scanning and reading the sensor signal;

(6) the signal calibration instrument comparing the sensor signal to the standard physical input and calculating a calibration information; and (7) the signal calibration instrument storing the calibration information in memory for future use.

21. The sensor module of claim 20, further comprising a client-side procedure for testing physical inputs, which comprises:

(1) preparing the sensor module with the memory storing the calibration information;

(2) the sensor module detecting a physical input and generating a corresponding sensor signal;

(3) a microcontroller unit MCU reading the sensor signal;

(4) the microcontroller unit MCU comparing the sensor signal with the calibration information in the memory; and (5) the microcontroller unit MCU transmitting the calibrated sensor signal to an information processing unit for further processing.

22. The sensor module of claim 1, wherein a first set of multiple metal pads is positioned at the second end of the first circuit board to facilitate electrical coupling of the sensor module to external devices.

23. The sensor module of claim 1, wherein the memory is located directly on the first circuit board.

24. The sensor module of claim 1, wherein the memory is located directly on the sensing unit.

25. A sensor system, comprising:

a first sensor module and a second sensor module, wherein each of the first sensor module and the second sensor module comprises:

a sensing unit;

a tail circuit with a first end and a second end, wherein the first end of the tail circuit is electrically coupled to the sensing unit;

a first circuit board with a first end and a second end, wherein the first end of the first circuit board is electrically coupled to the second end of the tail circuit; and a memory located on one site selected from a group consisting of: the first circuit board, the tail circuit, and the sensing unit;

a first scanning circuit box electrically coupled to the first sensor module;

a first cable with a first end and a second end, wherein the first end of the first cable is electrically coupled to the first sensor module, and the second end of the first cable is electrically coupled to the first scanning circuit box;

an information processing unit electrically coupled to the first scanning circuit box;

a second cable with a first end and a second end, wherein the first end of the second cable is electrically coupled to the first scanning circuit box, and the second end of the second cable is electrically coupled to the information processing unit; and a second scanning circuit box with a first end and a second end, wherein the first end of the second scanning circuit box is electrically coupled to the second sensor module, and the second end of the second scanning circuit box is electrically coupled to the first scanning circuit box.

26. The sensor system of claim 25, further comprising:

a third cable with a first end and a second end, wherein the first end of the third cable is electrically coupled to the second sensor module, and the second end of the third cable is electrically coupled to the second scanning circuit box.

27. The sensor system of claim 26, further comprising:

a fourth cable with a first end and a second end, wherein the first end of the fourth cable is electrically coupled to the first scanning circuit box, and the second end of the fourth cable is electrically coupled to the second scanning circuit box.

28. The sensor system of claim 27, further comprising:

a third sensor module; and a third scanning circuit box with a first end and a second end, wherein:

the first end of the third scanning circuit box is electrically coupled to the third sensor module, and the second end of the third scanning circuit box is electrically coupled to the second scanning circuit box.

29. The sensor system of claim 28, further comprising:

a fifth cable with a first end and a second end, wherein the first end of the fifth cable is electrically coupled to the third sensor module, and the second end of the fifth cable is electrically coupled to the third scanning circuit box.

30. The sensor system of claim 29, further comprising:

a sixth cable with a first end and a second end, wherein the first end of the sixth cable is electrically coupled to the third scanning circuit box, and the second end of the sixth cable is electrically coupled to the second scanning circuit box.

31. A sensor system, comprising:

a sensor module, comprising:

a sensing unit;

a tail circuit with a first end and a second end, wherein the first end of the tail circuit is electrically coupled to the sensing unit;

a first circuit board with a first end and a second end, wherein the first end of the first circuit board is electrically coupled to the second end of the tail circuit; and a memory located on one site selected from the group consisting of: the first circuit board, the tail circuit, and the sensing unit, wherein a first set of multiple metal pads is positioned at the second end of the first circuit board to facilitate electrical coupling of the sensor module to external devices; and a scanning circuit box electrically coupled to the sensor module, the scanning circuit box having:

a second circuit board;

a second set of multiple metal pads positioned at a first end of the second circuit board, the first end of the second circuit board extending to a side of the scanning circuit box; and an opening configured in the side of the scanning circuit box that, when the first circuit board is inserted, facilitates electrical coupling of the second set of multiple metal pads to the first set of multiple metal pads.

* * * * *